(12) United States Patent
Takagi et al.

(10) Patent No.: US 8,606,487 B2
(45) Date of Patent: Dec. 10, 2013

(54) CONTROL DEVICE FOR INTERNAL COMBUSTION ENGINE

(75) Inventors: Noboru Takagi, Toyota (JP); Hiromitu Seo, Toyota (JP); Eiichiro Kido, Nagoya (JP); Takamitsu Mizutani, Toyota (JP); Hirokazu Ando, Nisshin (JE)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/634,048

(22) PCT Filed: Apr. 9, 2010

(86) PCT No.: PCT/JP2010/056446
§ 371 (c)(1),
(2), (4) Date: Sep. 11, 2012

(87) PCT Pub. No.: WO2011/125220
PCT Pub. Date: Oct. 13, 2011

(65) Prior Publication Data
US 2013/0024096 A1 Jan. 24, 2013

(51) Int. Cl.
*F02P 5/15* (2006.01)

(52) U.S. Cl.
USPC ........... 701/103; 123/406.45; 123/406.48; 123/90.15; 123/675; 123/681

(58) Field of Classification Search
USPC ............. 701/103; 123/90.15–90.18, 406.45, 123/406.48, 675, 681, 682
See application file for complete search history.

(56) References Cited

U.S. PATENT DOCUMENTS

| | | | |
|---|---|---|---|
| 5,168,851 A * | 12/1992 | Itoyama et al. | 123/399 |
| 6,626,144 B1 | 9/2003 | Kanamaru | |
| 7,607,416 B2 * | 10/2009 | Sato | 123/406.24 |
| 2003/0075151 A1 | 4/2003 | Machida et al. | |
| 2003/0116130 A1 * | 6/2003 | Kisaka et al. | 123/406.45 |
| 2003/0209228 A1 * | 11/2003 | Miura | 123/399 |
| 2010/0198485 A1 | 8/2010 | Ohtsuka et al. | |

FOREIGN PATENT DOCUMENTS

| | | |
|---|---|---|
| JP | 2001 98998 | 4/2001 |
| JP | 2001 280228 | 10/2001 |

(Continued)

OTHER PUBLICATIONS

International Search Report Issued Jun. 1, 2010 in PCT/JP10/56446 Filed Apr. 9, 2010.

*Primary Examiner* — Erick Solis
(74) *Attorney, Agent, or Firm* — Oblon, Spivak, McClelland, Maier & Neustadt, L.L.P.

(57) ABSTRACT

The present invention has an object to enable a torque as required to be realized without being influenced by an operation state of an IN-VVT, which is a variable valve timing mechanism which changes a valve timing of an intake valve. For this purpose, a control device for an internal combustion engine provided by the present invention stores data that defines a relationship between an air quantity and a torque in an MBT in association with the operation state of the IN-VVT, and calculates a target air quantity for realizing a required torque based on the data. The control device calculates an actual air quantity which is actually realized by an operation of a throttle when operating the throttle to realize the target air quantity. Further, the control device for an internal combustion engine provided by the present invention stores data that defines a relationship of the air quantity and an ignition timing in a case in which the IN-VVT is in a maximum retardation position, and calculates a basic ignition timing from the actual air quantity based on the data. Further, the control device for an internal combustion engine provided by the present invention determines an advance correction amount of the ignition timing from the operation state of the IN-VVT. The control device determines a final ignition timing from the basic ignition timing and the advance correction amount.

4 Claims, 4 Drawing Sheets

(56) References Cited

FOREIGN PATENT DOCUMENTS

| | | |
|---|---|---|
| JP | 2003 184587 | 7/2003 |
| JP | 2005 90331 | 4/2005 |
| JP | 2006 200466 | 8/2006 |
| JP | 2009 47101 | 3/2009 |
| JP | 2010 190196 | 9/2010 |
| JP | 4968081 | 7/2012 |

* cited by examiner

CONTROL DEVICE FOR INTERNAL COMBUSTION ENGINE

TECHNICAL FIELD

The present invention relates to an internal combustion engine which can control torque by an air quantity and an ignition timing, and more particularly to a control device for a spark ignition type internal combustion engine that has a variable valve timing mechanism which changes a valve timing of an intake valve and a throttle.

BACKGROUND ART

Conventionally, in regard to control of an internal combustion engine for an automobile, torque demand control has been known, which controls operations of actuators such as a throttle and an ignition device to realize a required torque. For example, Japanese Patent Laid-Open No. 2006-200466 and Japanese Patent Laid-Open No. 2009-047101 describe the inventions relating to such torque demand control.

In the torque demand control of an internal combustion engine, integrated control of each of the actuators relating to the operation of the internal combustion engine is performed. In the case of a spark ignition type internal combustion engine having a throttle, torque can be controlled by integrated control of the throttle and an ignition device. However, in the process of the integrated control, the operation states of the other actuators need to be taken into consideration. More specifically, in the case of an internal combustion engine having a variable valve timing mechanism (hereinafter, described as IN-VVT) which changes the valve timing of an intake valve, the respective operation amounts of the throttle and the ignition device need to be determined with the operation state of the IN-VVT taken into consideration. This is because the valve timing of the intake valve affects an internal EGR, and the internal EGR has an influence on the torque of the internal combustion engine.

The influence which the operation state of an IN-VVT has on torque will be described more specifically. When the IN-VVT is at the maximum retardation position, the valve overlap of the intake valve and the exhaust valve does not exist, and the internal EGR becomes the minimum. Therefore, if the ignition timing is constant, the torque becomes the maximum when the IN-VVT is located at the maximum retardation position. As the valve timing of the intake valve advances more, the influence of the internal EGR becomes larger, and the torque becomes smaller than the maximum torque. FIG. 6 shows the state by a pressure-crank angle diagram. In FIG. 6, changes of the cylinder pressure after the ignition timing shown by a star mark are shown by being compared between the case in which the valve timing of the intake valve is the maximum retardation, and the case in which the valve timing is advanced by 20 degrees in the crank angle from the maximum retardation position. Here, the time when the IN-VVT is at the maximum retardation position is set as a reference, and the valve timing (INVT) of the intake valve at this time is set as 0 degrees. As shown in FIG. 6, by advance of the valve timing of the intake valve, a delay occurs in the combustion center, and as a result, the maximum value of the cylinder pressure is reduced. The delay of the combustion center is due to reduction of the combustion speed by increase in the EGR rate. Torque is correlated with the maximum value of the cylinder pressure, and therefore, reduction in torque occurs by the combustion center being delayed by advance of the valve timing of the intake valve.

However, in the ranges of the literatures which are known to the public at the present point of time, the description relating to the integrated control which takes the operation state of an IN-VVT into consideration is not found. Thus, one method of the integrated control which was studied in the inventing process of the present invention will be introduced.

The studied method is the method which reflects the operation state of an IN-VVT, that is, the valve timing of the intake valve in the ignition timing control. In this method, the valve timing of the intake valve is not taken into consideration in the process of calculating a target air quantity from a required torque. The air quantity required for realization of the required torque is calculated on the precondition that the valve timing of the intake valve is at the maximum retardation, irrespective of the actual valve timing of the intake valve, and the throttle is controlled with the calculated air quantity as a target air quantity. Subsequently, the ignition timing is corrected by being advanced in accordance with the actual valve timing of the intake valve to compensate reduction of the torque due to advance of the valve timing of the intake valve. The required torque has been expected to be realized without being influenced by the operation state of the IN-VVT by integrally controlling the throttle and the ignition device by the method like this.

However, it is actually difficult to realize the torque as required with only correction of the ignition timing. FIG. 7 shows the correction result of the ignition timing according to the aforesaid method by a pressure-crank angle diagram. As shown in FIG. 7, when the ignition timing is corrected by being advanced in the state in which the valve timing of the intake valve is advanced (VT=20 in FIG. 7), the maximum value of the cylinder pressure exceeds the cylinder pressure which is sufficient for realization of the required torque. More specifically, torque is excessively outputted to exceed the require torque. This is considered to be because increase in the internal EGR due to advance of the valve timing of the intake valve leads to various factors to increase the torque, such as reduction in pumping loss, increase in the compression end pressure, or reduction in cooling loss.

SUMMARY OF INVENTION

The present invention is made in view of the problem as described above. An object of the present invention is to provide a control device for an internal combustion engine which can realize a torque as required without being influenced by an operation state of an IN-VVT.

According to one mode of the present invention, a control device stores data that defines a relationship between an air quantity and a torque in a MBT in association with the operation state of an IN-VVT, and calculates a target air quantity for realizing a required torque based on the data. Subsequently, the control device controls a throttle to realize the target air quantity. Control of the IN-VVT is performed as a natural consequence in accordance with the operation state of the internal combustion engine. Further, the control device stores data that defines a relationship of the air quantity and the MBT in a case in which the IN-VVT is in a maximum retardation position, and calculates a basic ignition timing from an actual air quantity which is actually realized by an operation of the throttle, based on the data. Further, the control device determines an advance correction amount of an ignition timing for compensating a difference of the torque realized at the basic ignition timing and the required torque from the operation state of the IN-VVT, and determines a final ignition timing from the basic ignition timing and the advance correction amount. As a method for determining the advance correction amount of the ignition timing, it is preferable that data that defines the advance correction amount of the ignition timing in association with an advance amount from the maximum retardation position of the IN-VVT is previously stored in the control device, and the advance correction amount is determined by using the data.

According to the aforementioned mode, the operation state of the IN-VVT is taken into consideration in both the calculation process of the target air quantity and the calculation process of the ignition timing. Therefore, precise torque control is enabled, and a torque as required can be realized without being influenced by the operation state of the IN-VVT.

DESCRIPTION OF EMBODIMENTS

Hereinafter, an embodiment of the present invention will be described with reference to each of FIG. 1 to FIG. 5.

An internal combustion engine which is a target of control in the present embodiment is a spark ignition type internal combustion engine having an IN-VVT (intake side variable valve timing mechanism) in addition to a throttle and an ignition device, as an actuator relating to an operation of the internal combustion engine. A control device of the present embodiment controls the IN-VVT so as to provide an optimal valve timing corresponding to an operation state (for example, an engine speed and a load) of the internal combustion engine. Further, the control device of the present embodiment performs torque control of the internal combustion engine by integrated control of the throttle and the ignition device. In the process of the integrated control, an operation state of the IN-VVT, that is, the valve timing of an intake valve is used as one parameter.

Figure 1:
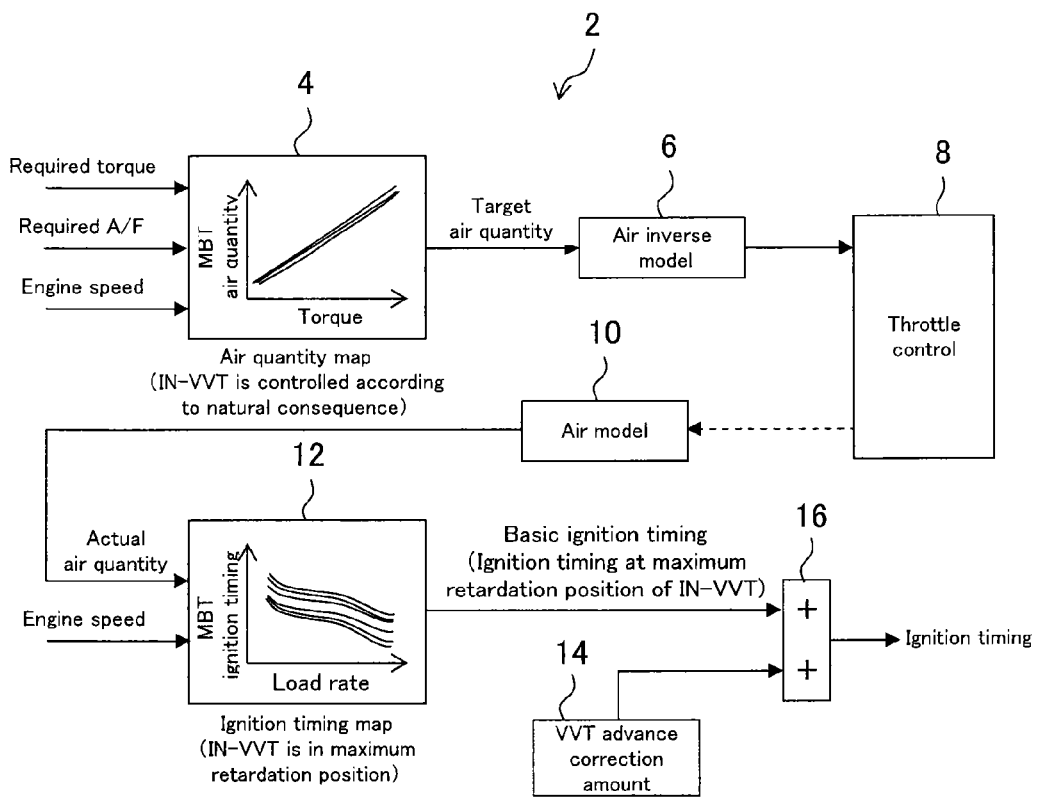
FIG. 1 is a block diagram showing a configuration of a control device for an internal combustion engine of an embodiment of the present invention.

FIG. 1 is a block diagram showing a configuration of the control device for the internal combustion engine of the embodiment of the present invention. As shown in FIG. 1, a control device 2 of the present embodiment can be divided into a target air quantity calculating section 4, a target throttle opening calculating section 6, a throttle control section 8, an actual air quantity calculating section 10, a basic ignition timing calculating section 12, a VVT advance correction amount calculating section 14 and a final ignition timing calculating section 16 in accordance with the functions which the control device has. These elements 4, 6, 8, 10, 12, 14 and 16 are the result of specially expressing only the elements relating to the operations of the throttle and the ignition device for torque control in the drawing. Accordingly, FIG. 1 does not mean that the control device is configured by only these elements 4, 6, 8, 10, 12, 14 and 16. The respective elements 4, 6, 8, 10, 12, 14 and 16 may be each configured by exclusive hardware, or may be virtually configured by software by sharing hardware.

The control device 2 acquires a required torque and a required A/F (air-fuel ratio). In a control system of a vehicle, a power train manager (not illustrated) is disposed in a rank higher than the control device 2. The required torque and the required A/F are supplied to the control device 2 by the power train manager.

The control device 2 inputs the acquired required torque and required A/F into the target air quantity calculating section 4 together with the engine speed at the present point of time. The target air quantity calculating section 4 includes an MBT air quantity map. The MBT air quantity map is a map that defines the relation of the air quantity and the torque in the MBT in association with the engine speed, the A/F and the operation state of the IN-VVT, and is created based on the data obtained by experiments. The target air quantity calculating section 4 calculates a target air quantity by searching the MBT air quantity map with the inputted information as a key. The target air quantity which is calculated from the MBT air quantity map is an air quantity which is necessary to realize the required torque on the precondition that the valve timing is controlled to be at the optimal point determined from the operation state. Accordingly, as the optimal point of the valve timing of the intake valve which is determined as a natural consequence is at a more advanced side, the target air quantity which is calculated from the MBT air quantity map is corrected to be a smaller value.

Next, the control device 2 inputs the target air quantity into the throttle opening calculating section 6. The target throttle opening calculating section 6 includes an air inverse model. A physical model which is the result of modeling the response of the air quantity to the operation of the throttle is an air model, and the air inverse model is an inverse model of the air model. By inputting the target air quantity into the air inverse model, a target throttle opening for realizing it is calculated.

The control device 2 inputs the target throttle opening into the throttle control section 8. The throttle control section 8 controls the throttle in accordance with the target throttle opening. At this time, so-called throttle delay control may be performed, which delays the inputted target throttle opening by a predetermined delay time, and controls the throttle in accordance with the target throttle opening after being delayed. The opening of the throttle changes from moment to moment by receiving control by the throttle control section 8. The change of the opening can be measured by a throttle opening sensor (not illustrated) which is attached to the throttle.

The control device 2 inputs the measured throttle opening into the actual air quantity calculating section 10. The actual air quantity calculating section 10 includes a forward model of the aforementioned air model. The throttle opening is inputted into the air model, and thereby the actual air quantity which is realized by this is calculated.

Next, the control device 2 inputs the calculated actual air quantity into the basic ignition timing calculating section 12 together with the engine speed at the present point of time. The basic ignition timing calculating section 12 includes an ignition timing map. The ignition timing map is the map in which the relationship of the air quantity and the ignition timing in the case in which the IN-VVT is in the maximum retardation position is set, and is created based on the data which is obtained by experiments. The basic ignition timing calculating section 12 calculates a basic ignition timing by searching the ignition timing map with the inputted information as a key.

Further, the control device 2 also executes calculation in the VVT advance correction amount calculating section 14 in parallel with calculation of the basic ignition timing in the basic ignition timing calculating section 12. The VVT advance correction amount calculating section 14 determines an advance correction amount of the ignition timing (hereinafter, called a VVT advance correction amount) from the valve timing of the intake valve based on parallel characteristic data which will be described later.

Figure 2:
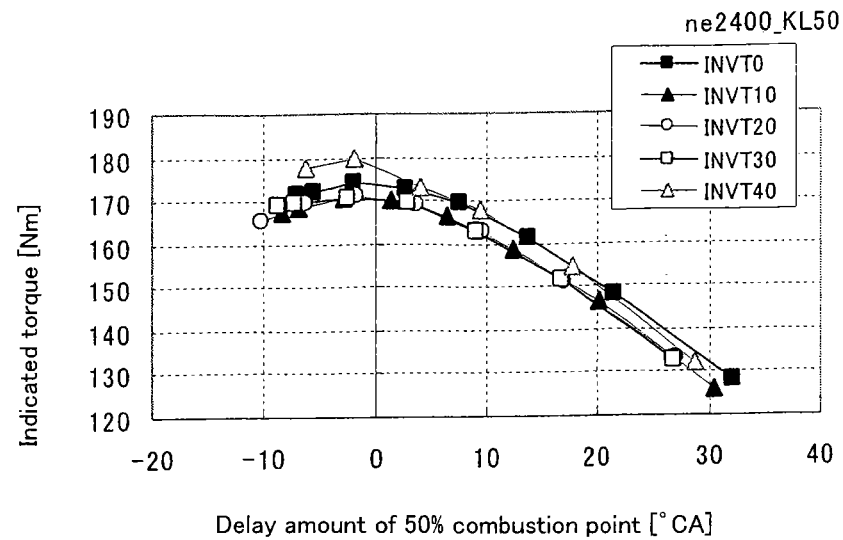
FIG. 2 is a diagram showing an experimental result of investigating an influence of a valve timing of an intake valve on a relationship between a 50% combustion delay amount and a torque.
Figure 3:
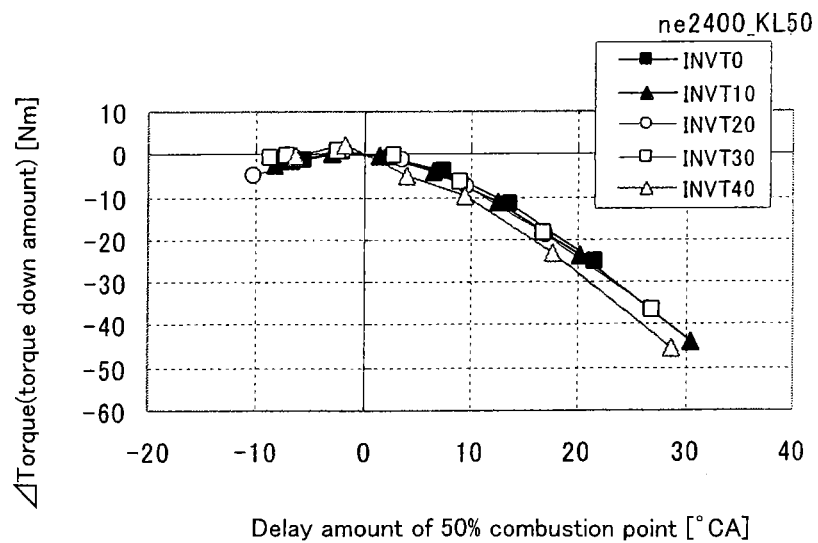
FIG. 3 is a diagram showing an experimental result of investigating an influence of the valve timing of the intake valve on a relationship between the 50% combustion delay amount and torque sensitivity.

FIG. 2 is a diagram showing an experimental result of investigating the influence of the valve timing of the intake valve (described as INVT in FIG. 2) on a delay amount of a 50% combustion point (combustion center) and the torque. From the drawing, it can be confirmed that the torque curve showing the relationship of the delay amount of the 50% combustion point and the torque changes in accordance with INVT, but the parallel characteristics are present among the torque curves in the respective INVT. Further, FIG. 3 is a diagram showing the result of calculating a torque down amount with each delay amount with respect to the torque at the time of the 50% combustion delay amount being zero, that is, a torque sensitivity by using the experimental result shown in FIG. 2. From the diagram, it can be confirmed that in the torque curves showing the relationship between the 50% combustion delay amounts and the torque sensitivities, the parallel characteristics can be seen among the INVTs.

In view of the parallel characteristics of the torque curves as above, it is understood that advance correction of the ignition timing is performed for the torque curve in the case of the IN-VVT being at the maximum retardation position, and thereby expression of the torque in an optional valve timing can be performed. The parallel characteristic data for determining the aforementioned VVT advance correction amount is created based on the knowledge as above.

The control device 2 inputs the VVT advance correction amount into the final ignition timing calculating section 16 together with the basic ignition timing. The final ignition timing calculating section 16 determines the result of adding the VVT advance correction amount to the basic ignition timing as a final ignition timing. The control device 2 controls the ignition device in accordance with the final ignition timing.

Figure 4:
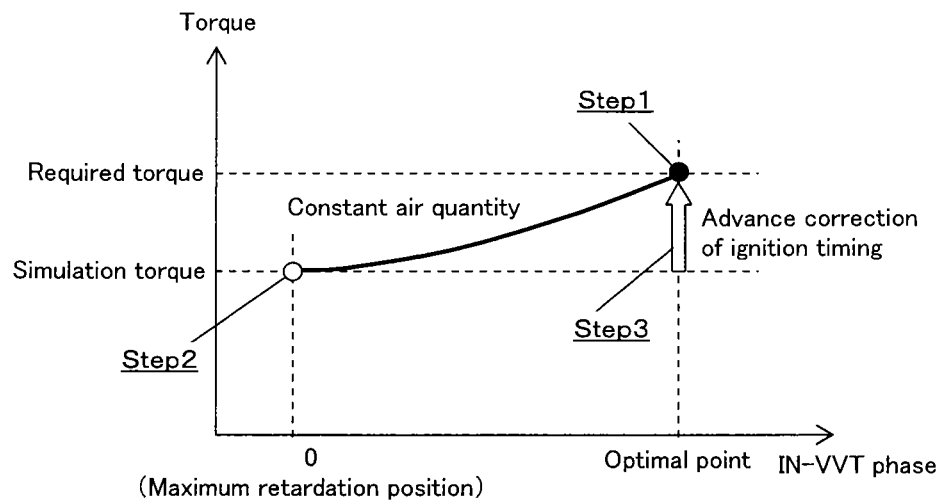
FIG. 4 is a diagram for explaining a method of torque control which is adopted in the embodiment of the present invention.
Figure 5:
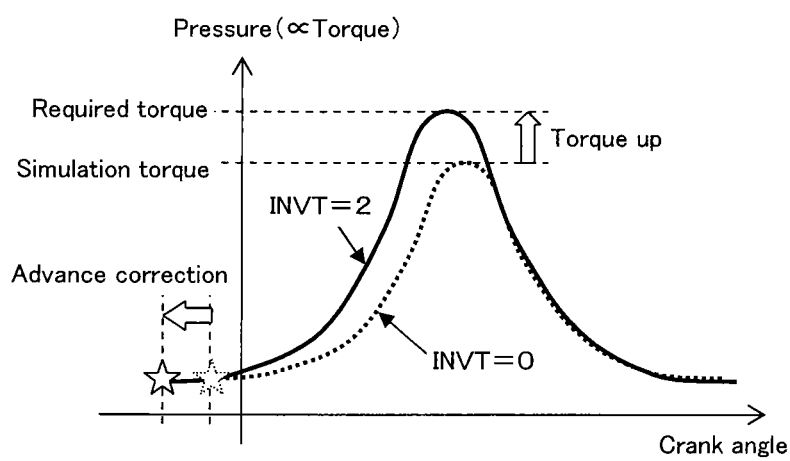
FIG. 5 is a diagram for explaining a method of torque control which is adopted in the embodiment of the present invention.
Figure 6:
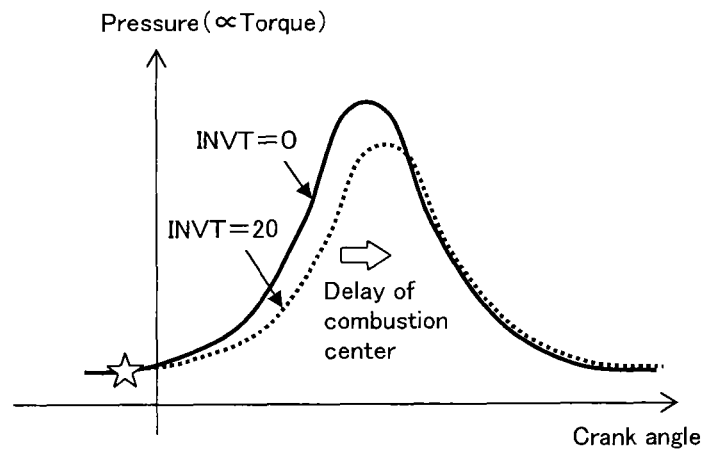
FIG. 6 is a diagram for explaining an influence of the valve timing of the intake valve on the torque.
Figure 7:
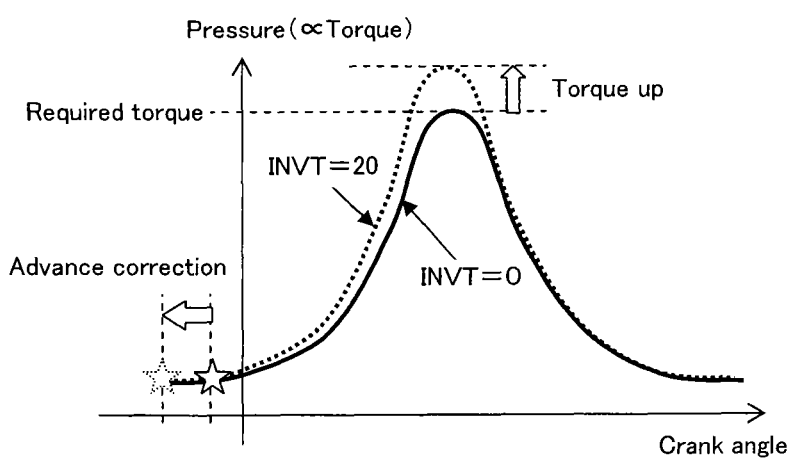
FIG. 7 is a diagram for explaining a problem of integrated control which is studied in an inventing process of the present invention.

The above description is explanation of the functions of the respective elements 4, 6, 8, 10, 12, 14 and 16 which configure the control device 2 of the present embodiment. By the functions of these elements 4, 6, 8, 10, 12, 14 and 16, the torque control for realizing the required torque is executed. FIG. 4 is a diagram expressing the method for the torque control which is adopted in the present embodiment by the relationship of the torque and the phase of the IN-VVT. Further, FIG. 5 is a diagram expressing the method for the torque control which is adopted in the present embodiment by a pressure-crank angle diagram.

As shown in FIG. 4, according to the method of the present embodiment, as the first step (Step 1), the target air quantity (MBT air quantity) at the optimal point of the IN-VVT which realizes the required torque is calculated. In the next step (Step 2), the ignition timing at the maximum retardation of the IN-VVT which satisfies the target air quantity is calculated as the basic ignition timing. The torque which can be realized by the basic ignition timing is shown as a simulation torque in each of FIGS. 4 and 5. The simulation torque is the torque which can be realized when the IN-VVT is at the maximum retardation position.

Subsequently, in the final step (Step 3), a VVT advance correction amount for compensating the difference between the simulation torque and the required torque is calculated based on the aforementioned parallel characteristics data. The VVT advance correction amount is added to the basic ignition timing, and thereby the final ignition timing for realizing the required torque is determined.

As described above, according to the present embodiment, the operation state of the IN-VVT is taken into consideration in both the calculation process of the target air quantity and the calculation process of the ignition timing. Consequently, precise torque control is enabled, and the torque as required can be realized without being influenced by the operation state of the IN-VVT.

The present invention is not limited to the aforementioned embodiment, and can be carried out by being variously modified within the range without departing from the gist of the present invention.

DESCRIPTION OF REFERENCE NUMERALS

2 Control device
4 Target air quantity calculating section
6 Target throttle opening calculating section
8 Throttle control section
10 Actual air quantity calculating section
12 Basic ignition timing calculating section
14 VVT advance correction amount calculating section
16 Final ignition timing calculating section

The invention claimed is:

1. A control device for a spark ignition type internal combustion engine having a variable valve timing mechanism which changes a valve timing of an intake valve, and a throttle, comprising:
   required torque acquiring means that acquires a required torque;
   variable valve timing mechanism control means that controls the variable valve timing mechanism in accordance with an operation state of the internal combustion engine;
   target air quantity calculating means that calculates a target air quantity for realizing the required torque, based on data that defines a relationship of an air quantity and a torque in an MBT in association with an operation state of the variable valve timing mechanism;
   throttle control means that controls the throttle to realize the target air quantity;
   actual air quantity calculating means that calculates an actual air quantity that is realized by an operation of the throttle;
   basic ignition timing calculating means that calculates a basic ignition timing from the actual air quantity, based on data that defines a relationship between an air quantity and an ignition timing in a case in which the variable valve timing mechanism is in a maximum retardation position;
   advance correction amount determining means that determines an advance correction amount of the ignition timing for compensating a difference between a torque which is realized in the basic ignition timing and the required torque from the operation state of the variable valve timing mechanism; and final ignition timing determining means that determines a final ignition timing from the basic ignition timing and the advance correction amount.

2. The control device for an internal combustion engine according to claim 1,
wherein the advance correction amount determining means determines the advance correction amount based on data that defines the advance correction amount of the ignition timing in association with an advance amount from the maximum retardation position of the variable valve timing mechanism.

3. A control device for a spark ignition type internal combustion engine having a variable valve timing mechanism which changes a valve timing of an intake valve, and a throttle, comprising:
   a variable valve timing mechanism controller that is programmed to control the variable valve timing mechanism in accordance with an operation state of the internal combustion engine;
   a throttle controller that is programmed to:
      acquire a required torque;
      calculate a target air quantity for realizing the required torque, based on data that defines a relationship of an air quantity and a torque in an MBT in association with an operation state of the variable valve timing mechanism; and
      control the throttle to realize the target air quantity; and
   an ignition timing controller that is programmed to:
      calculate an actual air quantity that is realized by an operation of the throttle;
      calculate a basic ignition timing from the actual air quantity, based on data that defines a relationship between an air quantity and an ignition timing in a case in which the variable valve timing mechanism is in a maximum retardation position;
      determine an advance correction amount of the ignition timing for compensating a difference between a torque which is realized in the basic ignition timing and the required torque from the operation state of the variable valve timing mechanism; and
      determine a final ignition timing from the basic ignition timing and the advance correction amount.

4. The control device for an internal combustion engine according to claim 3,
wherein the ignition timing controller is programmed to determine the advance correction amount based on data that defines the advance correction amount of the ignition timing in association with an advance amount from the maximum retardation position of the variable valve timing mechanism.

* * * * *